US010268663B1

(12) United States Patent
Lee

(10) Patent No.: US 10,268,663 B1
(45) Date of Patent: *Apr. 23, 2019

(54) DISPLAYING GRAPHICAL CONTENT ITEMS BASED ON AN AUDIO INPUT

(71) Applicant: Google Inc., Mountain View, CA (US)

(72) Inventor: Kwanho Lee, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,102

(22) Filed: Sep. 26, 2017

Related U.S. Application Data

(63) Continuation of application No. 14/014,093, filed on Aug. 29, 2013, now Pat. No. 9,779,065.

(51) Int. Cl.
G06F 17/00 (2006.01)
G06F 17/21 (2006.01)

(52) U.S. Cl.
CPC .................. G06F 17/212 (2013.01)

(58) Field of Classification Search
CPC ............. G06F 17/30873; G06F 17/30991
See application file for complete search history.

(56) References Cited

U.S. PATENT DOCUMENTS 7,065,520 B2  6/2006 Langford
9,779,065 B1  10/2017 Lee
2007/0299830 A1  12/2007 Muenchhoff et al.
2009/0113301 A1*  4/2009 Fisher ...................... G06F 8/61
                                                                        715/716
2009/0150806 A1  6/2009 Evje et al.
2010/0114874 A1  5/2010 Hansson et al.
2011/0072002 A1  3/2011 Kirkby et al.
2011/0258204 A1  10/2011 Hubbard et al.
2012/0284247 A1  11/2012 Jiang et al.
(Continued)

OTHER PUBLICATIONS

U.S. Notice of Allowance on U.S. Appl. No. 14/014,093 dated Jun. 13, 2017.
(Continued)

Primary Examiner — Scott T Baderman
Assistant Examiner — Barbara M Level
(74) Attorney, Agent, or Firm — Foley & Lardner LLP; James De Vellis

(57) ABSTRACT

A method for generating a matrix of graphical content items to be displayed on at least one client computing device having a display. The method is implemented by a server computing device communicatively coupled to a database and to the at least one client computing device. The method includes retrieving, from the database, a plurality of textual content items, a link to a landing page associated with each textual content item, and an image associated with at least a part of the landing page. The method includes generating a matrix including a plurality of portions, including, for each portion of the matrix, selecting one of the plurality of textual content items, and including, in the portion, text from the selected textual content item, the image associated with the landing page, and the link to the landing page, and transmitting data for display of the matrix to the client computing device.

20 Claims, 9 Drawing Sheets

(56) References Cited

U.S. PATENT DOCUMENTS

| | | | | |
|---|---|---|---|---|
| 2013/0124980 | A1* | 5/2013 | Hudson | G06F 17/21 |
| | | | | 715/243 |
| 2014/0108370 | A1* | 4/2014 | Andri | G06F 17/30749 |
| | | | | 707/706 |
| 2017/0092278 | A1 | 3/2017 | Evermann et al. | |
| 2017/0110130 | A1 | 4/2017 | Sharifi et al. | |
| 2017/0110144 | A1 | 4/2017 | Sharifi et al. | |
| 2017/0132019 | A1 | 5/2017 | Karashchuk et al. | |
| 2017/0358301 | A1 | 12/2017 | Raitio et al. | |

OTHER PUBLICATIONS

U.S. Office Action on U.S. Appl. No. 14/014,093 dated Feb. 9, 2016.
U.S. Office Action on U.S. Appl. No. 14/014,093 dated Aug. 8, 2016.
U.S. Office Action on U.S. Appl. No. 14/014,093 dated Aug. 13, 2015.
U.S. Office Action on U.S. Appl. No. 14/014,093 dated Feb. 24, 2017.
"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).

Google Developers, "GoogleAssistant SDK" reprinted from https://developers.google.com/assistant/sdk on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).

(56) References Cited

OTHER PUBLICATIONS

Siegal, Daniel, "IP Attys Load Up Apps' Legal Challenges At 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
Non-Final Office Action on U.S. Appl. No. 15/716,102 dated Aug. 31, 2018.

* cited by examiner

DISPLAYING GRAPHICAL CONTENT ITEMS BASED ON AN AUDIO INPUT

CROSS-REFERENCE TO RELATED APPLICATIONS

This application claims the benefit under 35 U.S.C. § 120 as a continuation of U.S. patent application Ser. No. 14/014, 093, filed Aug. 29, 2013, the entire disclosure of which is incorporated herein by reference.

BACKGROUND

This description relates to presenting content items on client computing devices, and more particularly, to generating and displaying graphical content items based on textual content items and landing pages associated with the textual content items.

In at least some known systems, a server computing device transmits a web page having multiple textual content items (e.g., advertisements) to a client computing device for display on the client computing device. The textual content items are based on textual creatives designed by one or more content providers (e.g., advertisers). In some known implementations, the textual content items are stacked vertically on the transmitted web page. Each of the textual content items links to a corresponding web page ("landing page") having further information relating to the textual content item. Other than the textual information in a textual content item, a user of the client computing device may not be presented with any additional information about the landing page that a particular textual content item links to and, accordingly, may choose not to select the textual content item to visit the linked landing page. Additionally, given that the textual content items do not include graphics, the textual content items may not appear as interesting to the user as they would if they did include graphics.

BRIEF DESCRIPTION OF DISCLOSURE

In one aspect, a method for generating a matrix of graphical content items to be displayed on at least one client computing device having a display is provided. The method is implemented by a server computing device that is communicatively coupled to a database and to the at least one client computing device. The method includes retrieving, from the database, a plurality of textual content items, a link to a landing page associated with each textual content item, and an image associated with at least a part of the landing page. The method also includes generating a matrix including a plurality of portions, including, for each portion of the matrix: selecting one of the plurality of textual content items and including, in the portion, text from the selected textual content item, the image associated with the landing page, and the link to the landing page. Additionally, the method includes transmitting data for display of the matrix to the client computing device.

In another aspect, a server computing device for generating a matrix of graphical content items to be displayed on at least one client computing device having a display is provided. The server computing device is communicatively coupled to a database and to the at least one client computing device. The server computing device is configured to retrieve, from the database, a plurality of textual content items, a link to a landing page associated with each textual content item, and an image associated with at least a part of the landing page. The server computing device is additionally configured to generate a matrix including a plurality of portions, including, for each portion of the matrix: select one of the plurality of textual content items and include, in the portion, the text from selected textual content item, the image associated with the landing page, and the link to the landing page. The server computing device is further configured to transmit data for display of the matrix to the client computing device.

In another aspect, a computer-readable storage device having processor-executable instructions embodied thereon is provided. The processor-executable instructions are for generating a matrix of graphical content items to be displayed on at least one client computing device having a display, wherein when executed by a server computing device communicatively coupled to a database and to the at least one client computing device, the processor-executable instructions cause the server computing device to perform the steps of: retrieving, from the database, a plurality of textual content items, a link to a landing page associated with each textual content item, and an image associated with at least a part of the landing page and generating a matrix including a plurality of portions. For each portion of the matrix, the processor-executable instructions cause the server computing device to select one of the plurality of textual content items and include, in the portion, text from the selected textual content item, the image associated with the landing page, and the link to the landing page. The processor-executable instructions further cause the server computing device to perform the step of transmitting data for display of the matrix to the client computing device.

In another aspect, a server computing device for generating a matrix of graphical content items to be displayed on at least one client computing device having a display is provided. The server computing device is communicatively coupled to a database and to the at least one client computing device. The server computing device includes means for retrieving, from the database, a plurality of textual content items, a link to a landing page associated with each textual content item, and an image associated with at least a part of the landing page. Additionally, the server computing device includes means for generating a matrix including a plurality of portions, including for each portion of the matrix, selecting one of the plurality of textual content items and including, in the portion, text from the selected textual content item, the image associated with the landing page, and the link to the landing page. Additionally, the server computing device includes means for transmitting data for display of the matrix to the client computing device.

In another aspect, a server computing device as described above is provided, wherein the means for generating the matrix further includes means for formatting the matrix to have two rows.

In another aspect, a server computing device as described above is provided, wherein the means for generating the matrix further includes means for formatting the matrix to have two rows and four columns.

In another aspect, a server computing device as described above is provided, wherein the means for generating the matrix further comprises means for, for each portion of the matrix, positioning a title of the selected textual content item above the image associated with the landing page and positioning a description from the selected textual content item below the image associated with the landing page.

In another aspect, a server computing device as described above is provided, wherein the means for generating the matrix further comprises means for embedding the matrix in a web page having a width, wherein the matrix occupies an entirety of the width.

In another aspect, a server computing device as described above is provided, wherein the means for retrieving the plurality of textual content items further comprises means for retrieving a plurality of different textual content items.

In another aspect, a server computing device as described above is provided, wherein the server computing device further comprises means for formatting the text from each textual content item to be smaller than the image associated with the landing page.

In another aspect, a server computing device as described above is provided, wherein the server computing device further comprises means for overlaying the link to the landing page on top of the image associated with the landing page.

In another aspect, a server computing device as described above is provided, wherein the means for overlaying the link to the landing page on top of the image associated with the landing page further includes means for formatting the link to the landing page to have a semi-transparent grey background.

In another aspect, a server computing device as described above is provided, wherein the server computing device further comprises means for generating computer-executable instructions that, when executed by the at least one client computing device, cause the at least one client computing device to detect a selection of one of the portions of the matrix through an input device of the at least one client computing device and upon detecting the selection, access the landing page associated with the textual content item associated with the selected portion of the matrix, and transmitting the computer-executable instructions to the at least one client computing device.

In another aspect, a server computing device as described above is provided, wherein the server computing device further comprises means for accessing the landing page of at least one of the plurality of textual content items, generating the image associated with the landing page by generating an image of at least a portion of the landing page, and storing the image associated with the landing page in the database.

In another aspect, a server computing device as described above is provided, wherein the server computing device further comprises means for generating at least one keyword based on content in a publication, embedding the at least one keyword in the publication for display on the client computing device, and receiving, from the client computing device, an indication that the at least one keyword was selected on the client computing device and wherein the means for retrieving the plurality of textual content items further comprises means for retrieving, from the database, the plurality of textual content items based on the at least one keyword, upon receiving the indication that the at least one keyword was selected.

The features, functions, and advantages described herein may be achieved independently in various embodiments of the present disclosure or may be combined in yet other embodiments, further details of which may be seen with reference to the following description and drawings.

Figure 1:
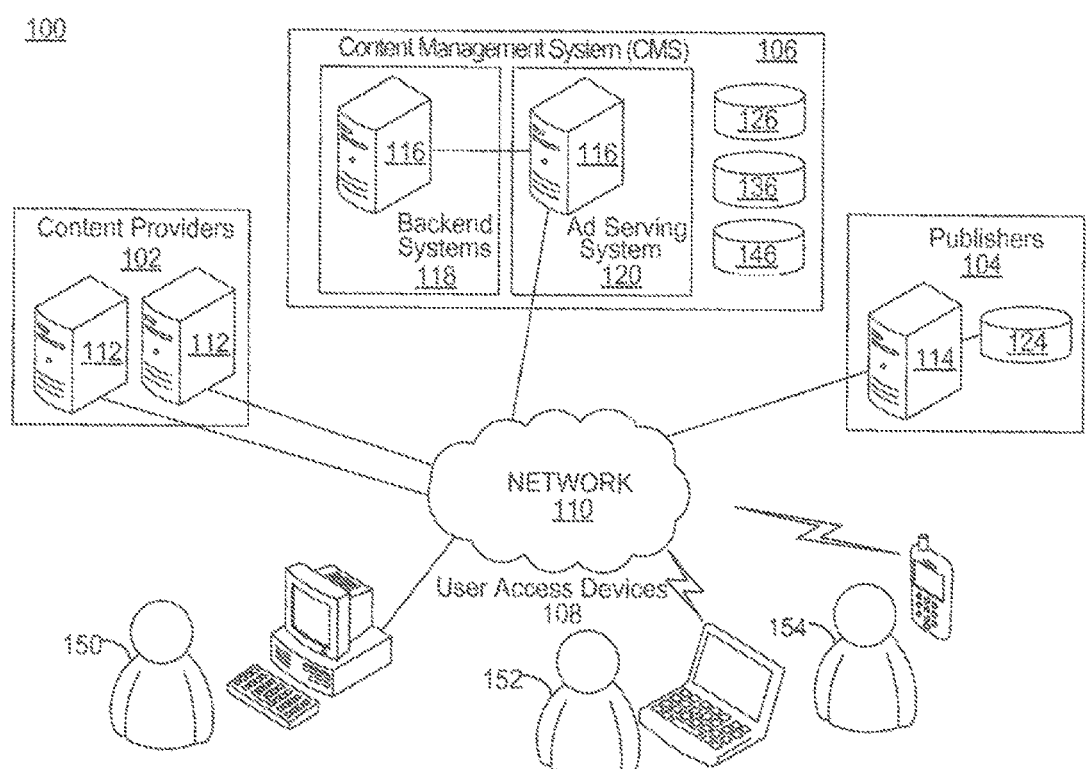
FIG. 1 is a diagram depicting an example networked environment.

Although specific features of various embodiments may be shown in some drawings and not in others, this is for convenience only. Any feature of any drawing may be referenced and/or claimed in combination with any feature of any other drawing.

DETAILED DESCRIPTION OF DISCLOSURE

The following detailed description of implementations refers to the accompanying drawings. The same reference numbers in different drawings may identify the same or similar elements. Also, the following detailed description does not limit the claims.

This subject matter described herein relates to presenting content items on client computing devices, and more particularly, to generating and displaying graphical content items based on textual content items and landing pages associated with the textual content items. Content items are, for example, advertisements associated with goods or services. Generally, a content item includes assets, which may be, for example, images, audio, video, and/or text. For the purposes of this disclosure, a textual content item is a content item that includes text but does not include images, audio, or video, and a graphical content item includes at least an image. The methods and systems described herein facilitate generating a matrix of a plurality of graphical content items that are based on corresponding textual content items and images associated with landing pages linked to by the textual content items.

More specifically, methods and systems herein facilitate retrieving, from a database, multiple textual content items, a link to a landing page associated with each textual content item, and an image associated with at least a part of the landing page and generating a matrix that includes multiple portions. Generating the matrix includes, for each portion of the matrix, selecting one of the textual content items, and including, in the portion, text from the selected textual content item, the image associated with the landing page, and the link to the landing page. Accordingly, the resulting matrix includes, in each portion, a graphical content item that is based on the associated textual content item and landing page. The methods and systems also facilitate transmitting the matrix to a client computing device for display thereon.

In situations in which the systems discussed herein collect personal information about users, or may make use of personal information, the users may be provided with an opportunity to control whether programs or features collect user information (e.g., information about a user's social network, social actions or activities, profession, interests, preferences, or current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as a city, a ZIP code, or state level), so that a particular location of a user cannot be determined. Thus, the user may have control over how information is collected about the user and used by a content server.

As used herein, an element or step recited in the singular and proceeded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: (a) retrieving, from a database, a plurality of textual content items, a link to a landing page associated with each textual content item, and an image associated with at least a part of the landing page; (b) generating a matrix including a plurality of portions, including, for each portion of the matrix: selecting one of the plurality of textual content items, and including, in the portion, text from the selected textual content item, the image associated with the landing page, and the link to the landing page; and (d) transmitting the matrix to a client computing device.

FIG. 1 is a diagram depicting an example networked environment. With reference to FIG. 1, an example networked environment 100 may include one or more content providers 102, one or more publishers 104, a content management system (CMS) 106, and one or more user access devices 108 ("client computing devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content distribution network. In the example embodiment, content providers 102 include advertisers, and CMS 106 is an advertising management system.

The content providers 102 may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression. A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154.

As noted above, one or more of the publishers 104 may represent a publication network. In such an implementation, the content providers 102 may be able to present content to users through this publication network.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108.

The CMS 106 may include one or more data processing systems 116, such as servers or embedded systems, coupled to the network 110. It can also include one or more processes, such as server processes. In some examples, the CMS 106 may include a content serving system 120 and one or more backend processing systems 118. The content serving system 120 may include one or more data processing systems 116 and may perform functionality associated with delivering content to publishers or user access devices 108. The backend processing systems 118 may include one or more data processing systems 116 and may perform functionality associated with identifying relevant content to deliver, processing various rules, performing filtering processes, generating reports, maintaining accounts and usage information, and other backend system processing. The CMS 106 can use the backend processing systems 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The CMS 106 may include one or more interface or frontend modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, etc.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-throughs for content as well as the ratio of click-throughs to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website. The CMS 106 may store such information in a general database 146. In some examples, the CMS 106 can add search to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
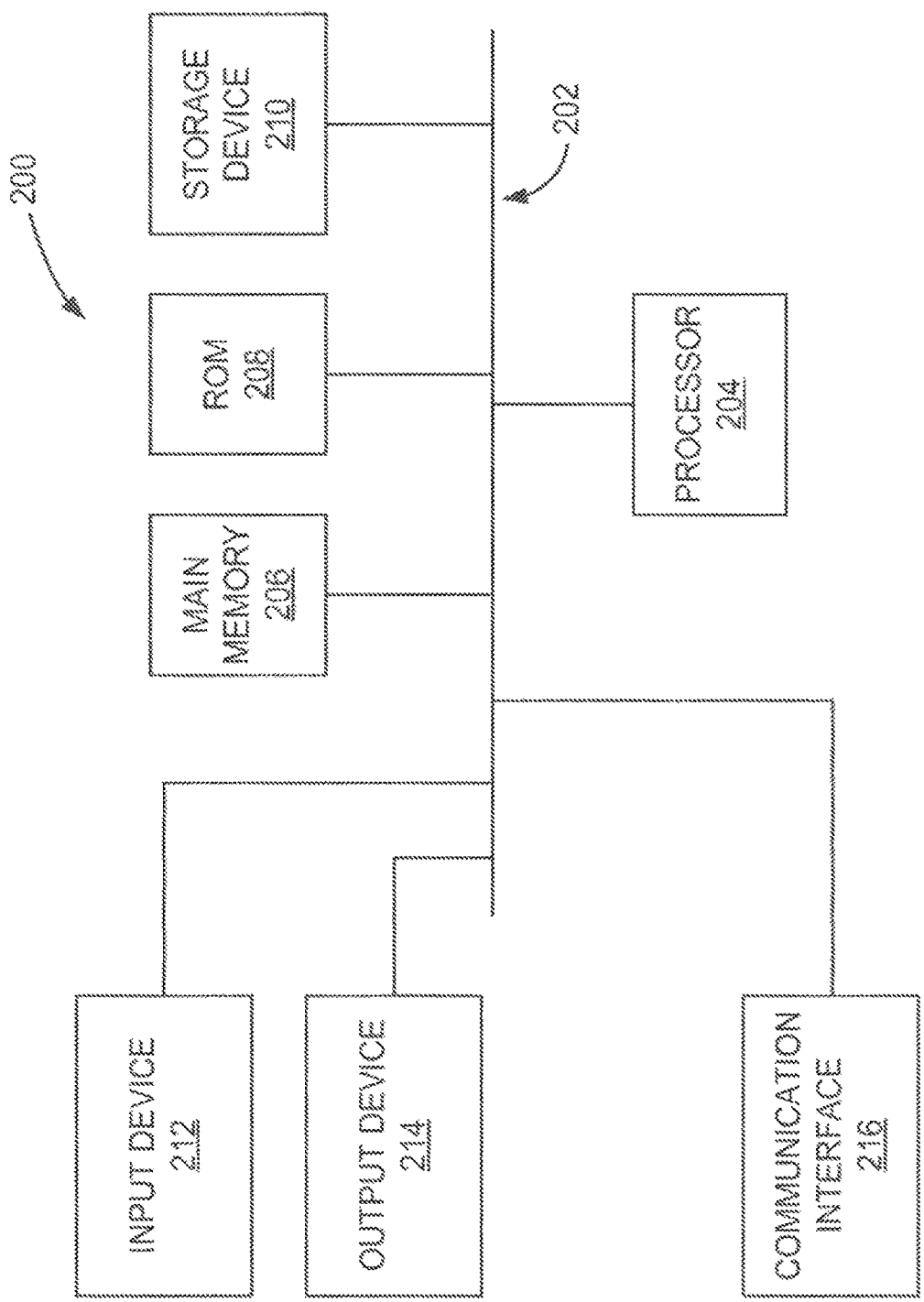
FIG. 2 is a diagram of an example computing device.

FIG. 2 shows an example of a generic computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 1). Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200.

Figure 3:
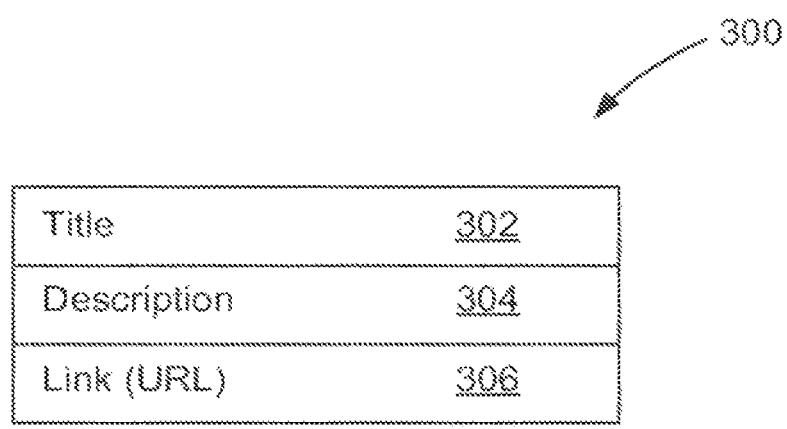
FIG. 3 is a block diagram of an example textual content item.

FIG. 3 is a block diagram of an example textual content item 300. Textual content item 300 includes a title 302, a description 304, and a link 306 (e.g., a uniform resource locator or URL) to a landing page associated with textual content item 300. More specifically, when textual content item 300 is displayed on client computing device 108 and selected by client computing device 108, client computing device 108 accesses the landing page linked to by link 306. In some implementations, textual content item 300 is a subcomponent (i.e., only the textual components) of a content item that includes both textual components and graphical and/or audio components.

Figure 4:
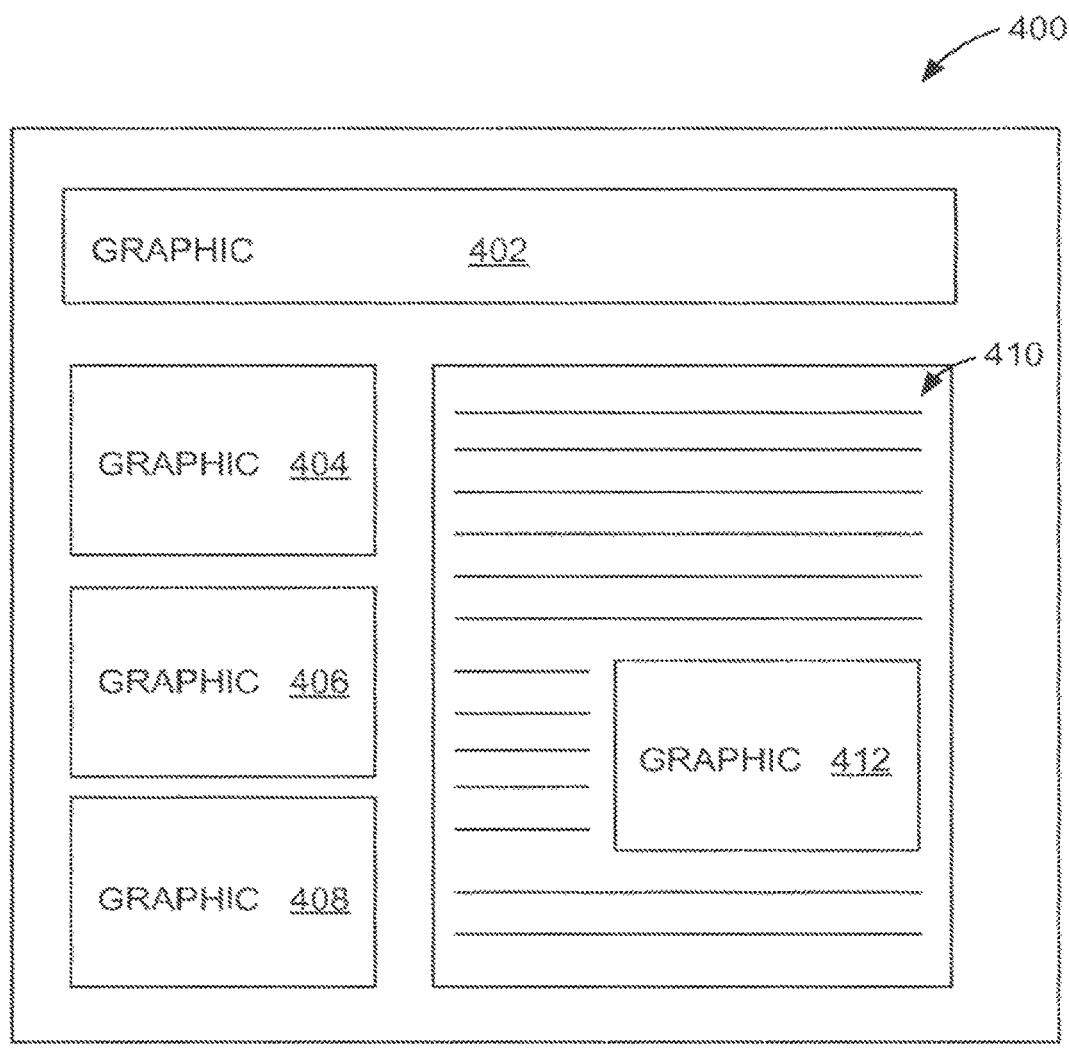
FIG. 4 is a diagram of a landing page associated with the textual content item of FIG. 3.

FIG. 4 is a diagram of a landing page 400 (e.g., a web page or other type of publication) associated with textual content item 300 (FIG. 3). Landing page 400 includes a first graphic 402, which may be, for example, a logo. Additionally, landing page 400 includes a second graphic 404, a third graphic 406, and a fourth graphic 408. Additionally, landing page 400 includes a text block 410 and a fifth graphic 412 positioned inline with text block 410. Each of graphics 402, 404, 406, 408, and 412 and text block 410 and any combination of graphics 402, 404, 406, 408, and 412 and text block 410 may be considered a "part" of landing page 400. As described above, landing page 400 is linked to at least by link 306 of textual content item 300.

Figure 5:
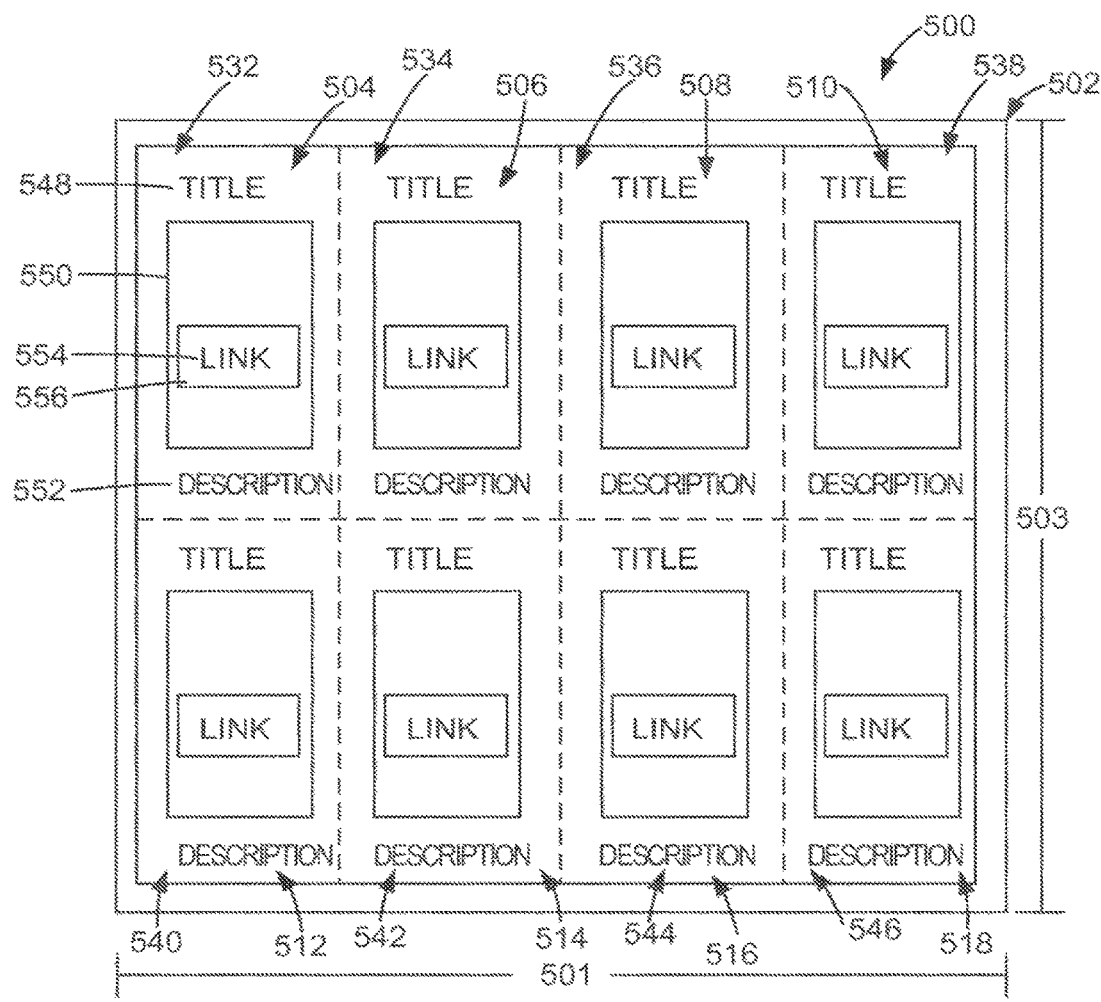
FIG. 5 is a diagram of a web page including a matrix of graphical content items generated based on textual content items and associated landing pages.

FIG. 5 is a diagram of a web page 500 including a matrix 502 of graphical content items including a first graphical content item 504, a second graphical content item 506, a third graphical content item 508, a fourth graphical content item 510, a fifth graphical content item 512, a sixth graphical content item 514, a seventh graphical content item 516 and an eighth graphical content item 518 generated based on corresponding textual content items, for example textual content item 300 (FIG. 3) and associated landing pages, for example landing page 400 (FIG. 4). Each graphical content item 504, 506, 508, 510, 512, 514, 516, and 518 is different, is based on a different textual content item 300, and accordingly, is associated with a different landing page 400. Matrix 502 may be considered a "speed dial" format for a plurality of content items. Matrix 502 includes a first row 520, a second row 522, a first column 524, a second column 526, a third column 528, and a fourth column 530 that define a first portion 532, a second portion 534, a third portion 536, a fourth portion 538, a fifth portion 540, a sixth portion 542, a seventh portion 544, and an eighth portion 546. Each of graphical content items 504, 506, 508, 510, 512, 514, 516 and 518 is located in a corresponding portion 532, 534, 536, 538, 540, 542, 544 and 546. In other implementations, the number of rows, columns, portions, and/or graphical content items may vary.

First graphical content item 504 includes a first title 548 that may be based on title 302 (FIG. 3) and a first image 550 associated with at least a part of a corresponding landing page, for example landing page 400 (FIG. 4). More specifically, first image 550 is an image of landing page 400 (FIG. 4) which is linked to by link 306 (FIG. 3) of textual content item 300 (FIG. 3). First graphical content item 504 additionally includes a first textual description 552, for example description 304 (FIG. 3) of textual content item 300 (FIG. 3). More specifically, first image 550 may be an image of at least a part of landing page 400. A server computing device, for example CMS 106 may access landing page 400, generate first image 550 based on at least part of landing page 400, for example by rendering all or a portion of landing page 400, and store first image 550 in memory, for example in content repository 126. When generating matrix 502, CMS 106 retrieves first image 550 from memory, for example content repository 126, and positions first image 550 within first portion 532. In other implementations and/or when first image 550 is not already in content repository 126, CMS 106 generates first image 550, as described above, during the generation of matrix 502 (i.e., "on the fly"). First textual description 552 is located below first image 550. In some implementations, CMS 106 formats first title 548 and first textual description 552 to be smaller than first image 550. Additionally, CMS 106 overlays a first link 554, for example link 306 (FIG. 3) of textual content item 300 (FIG. 3), onto first image 550. In some implementations, CMS 106 includes a semi-transparent grey background 556 behind first link 554, thereby increasing readability of first link 554. In some implementations, first link 554 is a URL.

CMS 106 performs a similar process as described above to generate and position graphical content items 506, 508, 510, 512, 514, 516, and 518 in respective portions 534, 536, 538, 540, 542, 544 and 546 of matrix 502. In some implementations, CMS 106 formats matrix 502 to occupy all or substantially all of the width 501 of web page 500. Also, in some implementations, CMS 106 formats matrix 502 to occupy all or substantially all of the height 503 of web page 500. Additionally, CMS 106 generates and transmits to a client computing device, for example client computing device 108, computer-executable instructions, for example hypertext markup language (HTML) or JavaScript, that, when executed by client computing device 108, cause client computing device 108 to detect a selection of one of portions 532, 534, 536, 538, 540, 542, 544 and 546 of matrix 502 through an input device, such as input device 212 of client computing device 108, and upon detecting the selection, access the landing page associated with the textual content item that corresponds to the selected portion of the matrix. For example, if client computing device 108 detected a selection of first portion 532, for example by user 150 clicking or tapping on first image 550 or any other items of first graphical content item 504, then client computing device 108 would access landing page 400 (FIG. 4), which is linked to by link 306 (FIG. 3) of textual content item 300. As described above, textual content item 300 is associated with first portion 532 because first title 548, first textual description 552, first link 554, and first image 550 are based on textual content item 300 and landing page 400.

Figure 6:
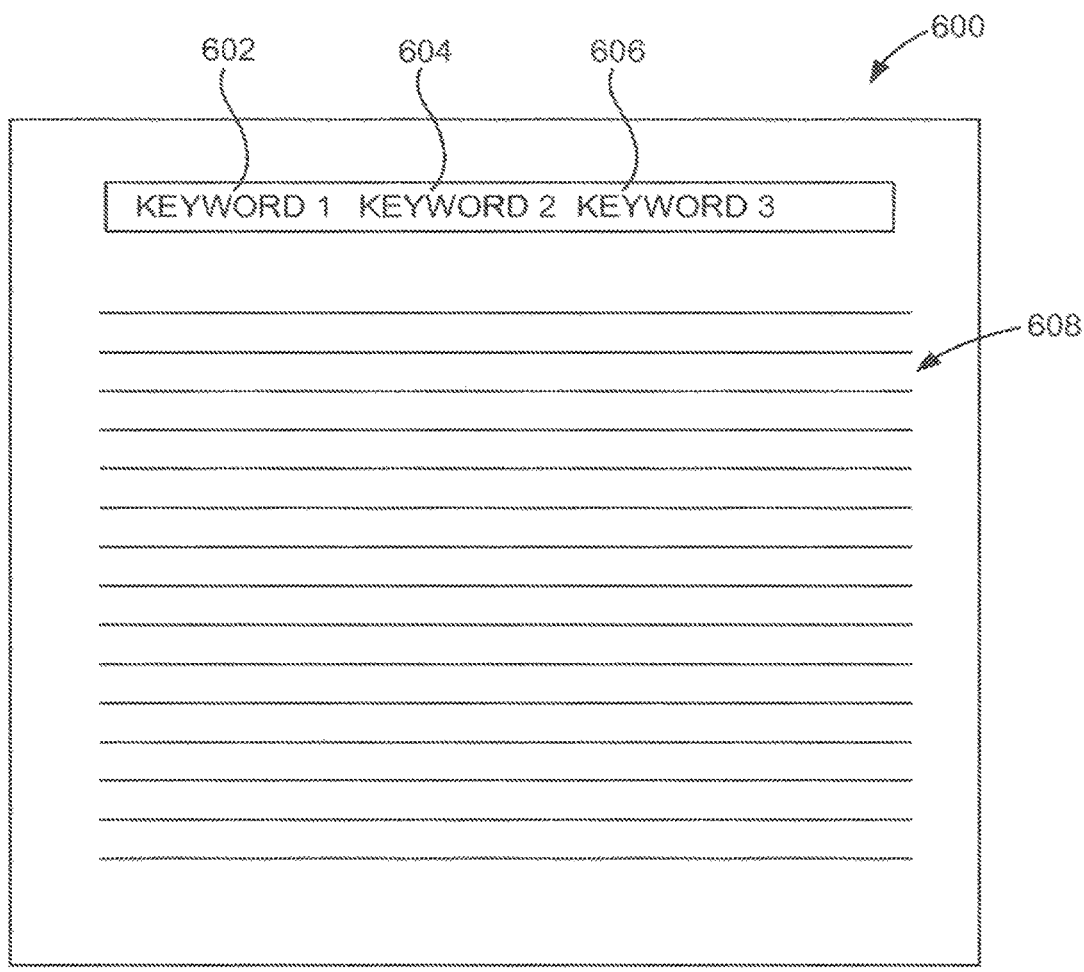
FIG. 6 is a diagram of an example publication including keywords that, when selected by a client computing device, cause a server computing device to generate a matrix similar to the matrix of FIG. 5.

FIG. 6 is a diagram of an example publication 600 including a first keyword 602, a second keyword 604, and a third keyword 606. CMS 106 generates keywords 602, 604, 606 based on text 608 and/or other information (e.g., meta tags) associated with publication 600. When one or more of keywords 602, 604, and 606 is selected by a client computing device, for example client computing device 108, CMS 106 generates matrix 502 (FIG. 5). More specifically, client computing device 108 transmits a signal to CMS 106 that includes an indication of which keyword 602, 604, 606 was selected and, upon receiving the signal, CMS 106 generates matrix 502. In this example, the graphical content items 504, 506, 508, 510, 512, 514, 516 and 518 in matrix 502 are generated from textual content items selected by CMS 106 based at least in part on the selected keyword 602, 604, 606. In some implementations, the graphical content items 504, 506, 508, 510, 512, 514, 516 and 518 in matrix 502 are generated from textual content items selected by CMS 106 based additionally on user interests associated with client computing device 108.

Figure 7:
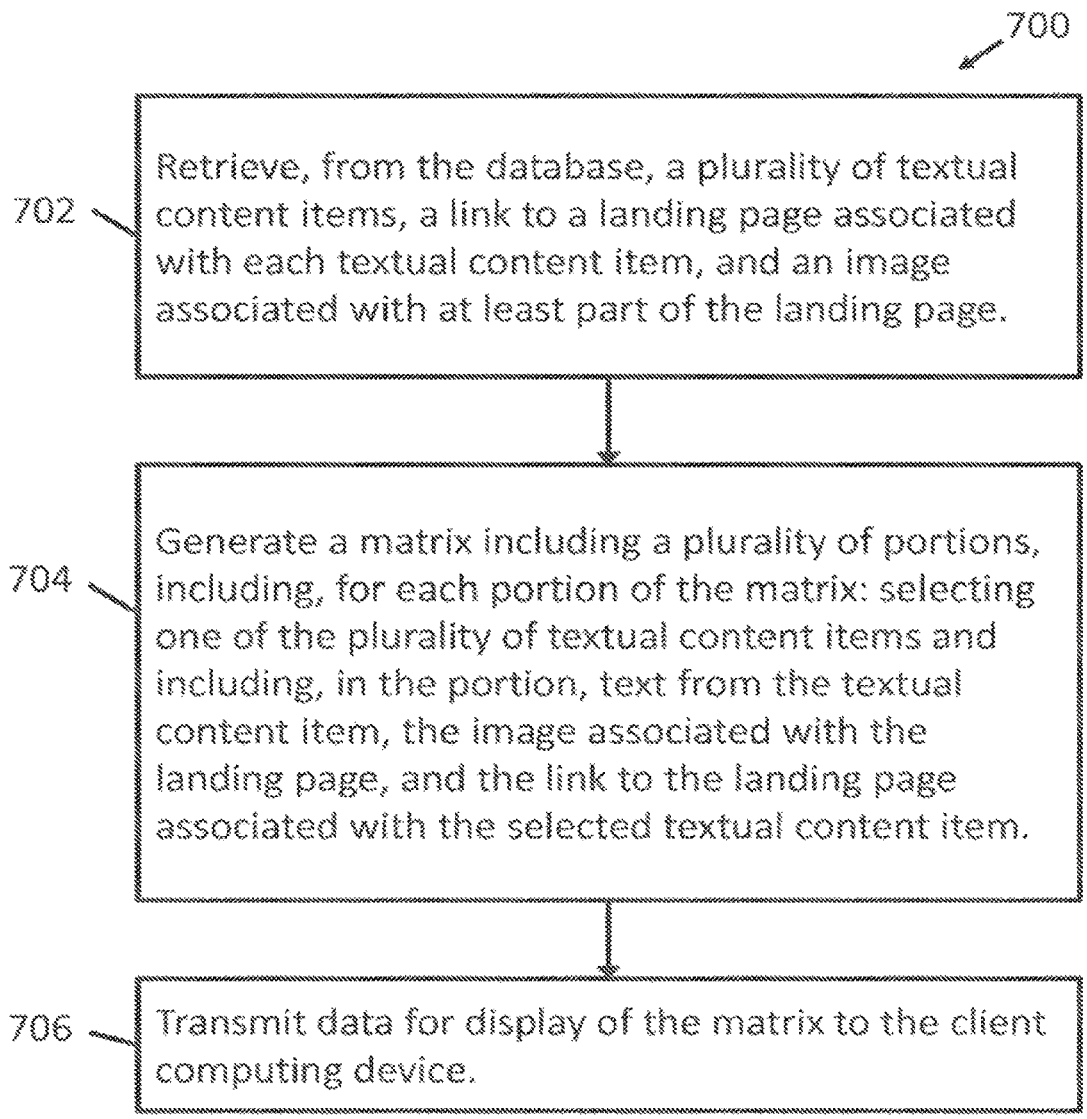
FIG. 7 is a flowchart of an example process for generating a matrix of graphical content items to be displayed on at least one client computing device.
Figure 8:
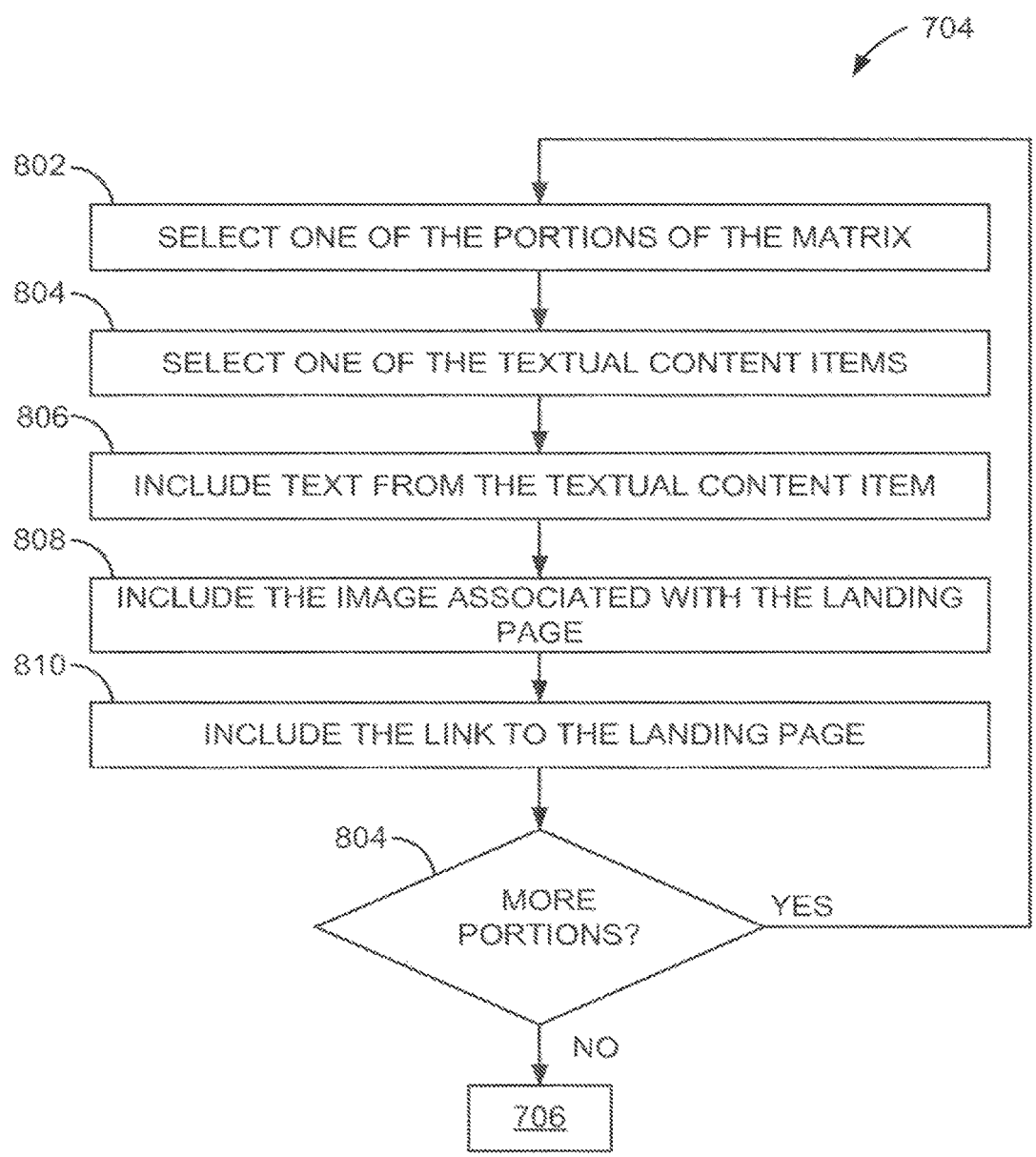
FIG. 8 is a flowchart with certain steps of the process of FIG. 7 shown in more detail.

FIG. 7 is a flowchart of an example process 700 for generating a matrix, for example matrix 502 (FIG. 5) of graphical content items, for example graphical content items 504, 506, 508, 510, 512, 514, 516 and 518, to be displayed on at least one client computing device, for example client computing device 108. FIG. 8 is a flowchart with certain steps of process 700 shown in more detail. Initially, a server computing device, for example CMS 106, retrieves 702 from a database, for example content repository 126, a plurality of textual content items 300, a link to a landing page associated with each textual content item, for example link 306 to landing page 400, and an image associated with at least a part of the landing page, for example first image 550. Next, CMS 106 generates 704 a matrix, for example matrix 502, including a plurality of portions, for example portions 532, 534, 536, 538, 540, 542, 544 and 546.

For each portion of matrix 502, CMS 106 selects one of the plurality of textual content items, for example textual content item 300, and includes, in the portion, for example portion 532, text from the selected textual content item 300, for example description 304, the image associated with the landing page, for example first image 550 associated with landing page 400, and the link to the landing page, for example link 306 to landing page 400. As described above, description 304 corresponds to first textual description 552 and link 306 corresponds to first link 554. More specifically, and with reference to FIG. 8, CMS 106 selects 802 one of the portions of matrix 502, for example first portion 532, then selects 804 one of the textual content items 300, for example from content repository 126. Next, CMS 106 includes 806 text from the textual content item 300, for example all or part of description 304, into the selected portion of matrix 502. Next, CMS 106 includes 808, in the selected portion, the image associated with at least part of the landing page associated with the selected textual content item 300. CMS 106 may retrieve the image associated with the landing page from a database, for example content repository 126. Next, CMS 106 includes 810 the link to the landing page associated with the selected textual content item 300 in the selected portion of matrix 502. By including the text, the image, and the link in the selected portion, CMS 106 forms a graphical content item in the selected portion of matrix 502. Next, CMS 106 determines 804 whether there are more portions in matrix 502. If so, then CMS 106 repeats the process, selecting another portion of matrix 502, for example second portion 534, and another textual content item to generate another graphical content item from. If, on the other hand, there are no remaining portions of matrix 502, then CMS 106 transmits 706 the matrix 502, to a client computing device, for example client computing device 108.

Figure 9:
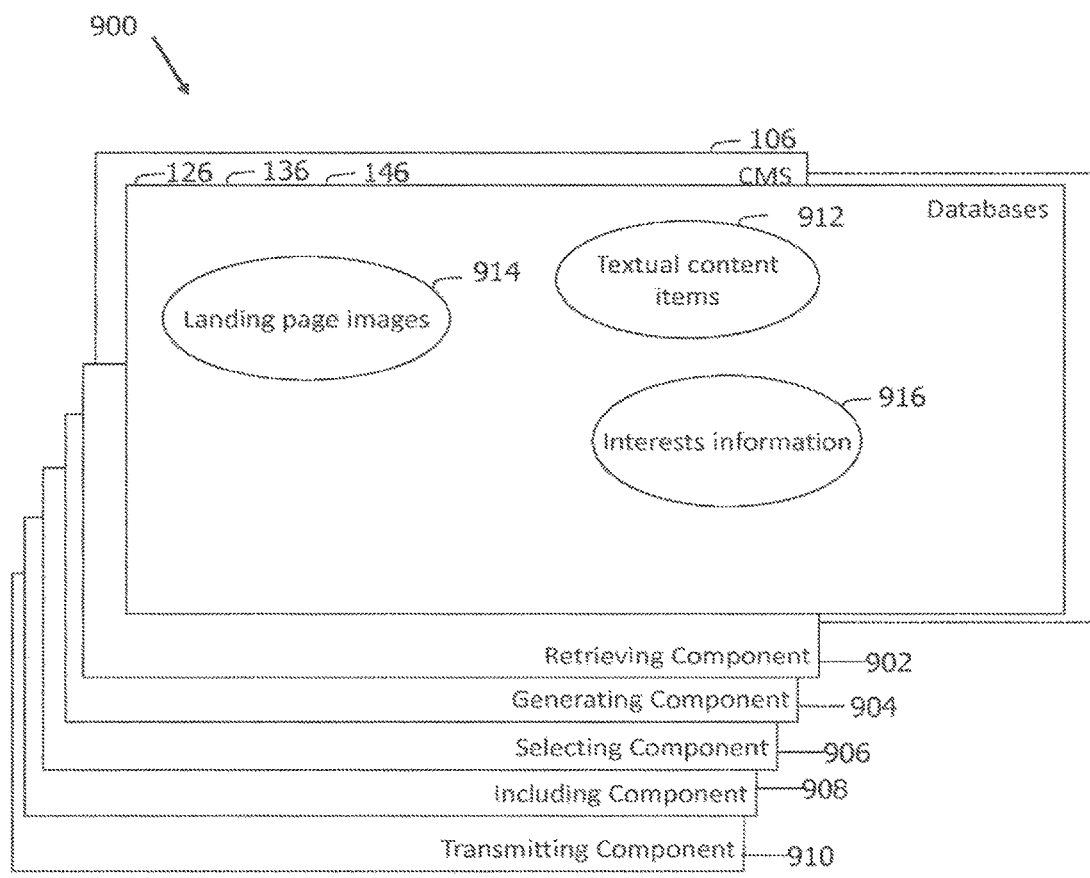
FIG. 9 is a diagram of components of one or more example computing devices that may be used in the environment shown in FIG. 1.

FIG. 9 is a diagram 900 of components of one or more example computing device 200, that may be used in the environment shown in FIG. 1. For example, one or more of computing devices 200 may form content management system (CMS) 106. FIG. 9 further shows a configuration of databases 126, 136, and 146 (FIG. 1). Databases 126, 136, and 146 are coupled to several separate components within CMS 106, which perform specific tasks.

CMS 106 includes a retrieving component 902 for retrieving, from a database, for example content repository 126, a plurality of textual content items 300, a link to a landing page associated with each textual content item, and an image associated with at least of a part of the landing page. Additionally, CMS 106 includes a generating component 904 for generating a matrix, for example matrix 502, including a plurality of portions, for example portions 532, 534, 536, 538, 540, 542, 544 and 546 (FIG. 5). Additionally, CMS 106 includes a selecting component 906 and an including component 908. Selecting component 906 selects a content item from the plurality of retrieved content items for each portion of the matrix 502. Including component 908 includes, in each portion of the matrix 502, text from a selected textual content item 300, an image associated with the landing page associated with the selected textual content item 300, and the link to the landing page. In some implementations, selecting component 906 and including component 908 are subcomponents of generating component 904.

Additionally, CMS 106 includes a transmitting component 910 for transmitting the matrix 502 to a client computing device 108.

In an exemplary embodiment, databases 126, 136, and 146 are divided into a plurality of sections, including but not limited to, a textual content items section 912, a landing page images section 914, and an interests information section 916, which may be used in retrieving and selecting textual content items 300 when generating a matrix, for example matrix 502. These sections within databases 126, 136, and 146 are interconnected to generate a matrix as described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or variations that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description may present features in terms of algorithms and symbolic representations of operations on information. Such algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A system to generate a matrix of graphical content items for provision to a client computing device having a display, the system comprising at least one server computing device communicatively coupled with a database and to the client computing device, the at least one server computing device configured to:
   receive an acoustic search query from the client computing device;
   retrieve, from the database and based on the acoustic search query, a first content item and a second content item, the first content item including a first link to a first landing page, the second content item including a second link to a second landing page;
   determine that a first image associated with the first landing page is not present in the database;
   index, responsive to the determination that the first image is not present in the database, the first landing page to generate the first image;
   generate a matrix represented by a data structure, the matrix including a plurality of portions, each portion of the plurality of portions proximate to at least two other portions of the plurality of portions; wherein to generate the matrix, the at least one server computing device:
   includes, in a first portion of the matrix, the first image, the first link, and text from the first content item;
   includes, in a second portion of the matrix, a second image associated with the second landing page of the second content item, the second link, and text from the second content item, and
   overlays, in the first portion of the matrix, the first link on top of the first image, an entire area of the first link within an entire area of the first image;
   overlays, in the second portion of the matrix, the second link on top of the second image, an entire area of the second link within an entire area of the second image; and
   transmits, to the client computing device, data for display of the matrix in a webpage.

2. The system of claim 1, wherein the first content item and the second content item each comprise an auditory component.

3. The system of claim 1, comprising the at least one server configured to:
   produce auditory output data for transmission with the data.

4. The system of claim 1, comprising the at least one server computing device configured to:
   position, in the first portion of the matrix, a title of the first content item above the first image and a description from the first content item below the first image; and
   position, in the second portion of the matrix, a title of the second content item above the second image and a description from the second content item below the second image.

5. The system of claim 1, comprising the at least one server computing device configured to:
   generate computer-executable instructions that, when executed by the client computing device, cause the client computing device to:
   detect a selection of one of the portions of the matrix through an auditory input device of the client computing device; and
   upon detecting the selection, access the landing page associated with the content item associated with the selected portion of the matrix; and
   transmit the computer-executable instructions to the client computing device.

6. The system of claim 1, comprising the at least one server computing device configured to:
   store, in the database, at least one of the first image and the second image.

7. The system of claim 1, comprising the at least one server computing device configured to:
   generate at least one keyword based on content in a publication;
   embed the at least one keyword in the publication for display on the client computing device;
   receive, from the client computing device, an indication that the at least one keyword was selected on the client computing device; and
   retrieve, from the database, a plurality of content items, by retrieving, from the database, a plurality of content items based on the at least one keyword, upon receiving the indication that the at least one keyword was selected.

8. A method of generating a matrix of graphical content items for display on a client computing device having a display, the method implemented by at least one server computing device communicatively coupled with a database and to the client computing device, the method comprising:

receiving, by the at least one server computing device, an acoustic search query from the client computing device;

retrieving, from the database and based on the acoustic search query, a first content item and a second content item, the first content item including a first link to a first landing page, the second content item including a second link to a second landing page;

determining that a first image associated with the first landing page is not present in the database;

indexing, responsive to the determination that the first image is not present in the database, the first landing page to generate the first image;

generating a matrix, by the at least one server computing device and during the indexing of the first landing page, the matrix represented by a data structure, the matrix including a plurality of portions, each portion is proximate to at least two other portions of the plurality of portions; wherein generating the matrix comprises:

including, in a first portion of the matrix, the first image, the first link, and text from the first content item;

including, in a second portion of the matrix, a second image associated with the second landing page of the second content item, the second link, and text from the second content item, and overlaying, in the first portion of the matrix, the first link on top of the first image, an entire area of the first link within an entire area of the first image;

overlaying, in the second portion of the matrix, the second link on top of the second image, an entire area of the second link within an entire area of the second image; and transmitting, to the client computing device, data for display of the matrix in a webpage.

9. The method of claim 8, wherein the first content item and the second content item each comprise an auditory component.

10. The method of claim 8, comprises:
producing auditory output data for transmission with the data.

11. The method of claim 8, comprises:
formatting the matrix to have two rows.

12. The method of claim 8, comprises:
formatting the matrix to have two rows and four columns.

13. The method of claim 8, comprises:
positioning, in the first portion of the matrix, a title of the first content item above the first image and a description from the first content item below the first image; and positioning, in the second portion of the matrix, a title of the second content item above the second image and a description from the second content item below the second image.

14. The method of claim 8, comprises:
retrieving a plurality of different content items.

15. The method of claim 8, comprises:
formatting a font size of the first content item to be smaller than a size of the first image; and
formatting a font size of the second content item to be smaller than a size of the second image.

16. The method of claim 8, comprises:
formatting the first link and the second link to each have a semi-transparent grey background.

17. The method of claim 8, comprises:
generating computer-executable instructions that, when executed by the client computing device, cause the client computing device to:

detect a selection of one of the portions of the matrix through an auditory input device of the client computing device; and upon detecting the selection, access the landing page associated with the content item associated with the selected portion of the matrix; and transmitting the computer-executable instructions to the client computing device.

18. The method of claim 8, comprises:
storing, in the database, at least one of the first image and the second image.

19. A non-transitory computer-readable storage device having processor-executable instructions embodied thereon, for generating a matrix of graphical content items to be displayed on a client computing device having a display, wherein when executed by a server computing device communicatively coupled to a database and to the client computing device, the processor-executable instructions cause the server computing device to perform the steps of:

receiving, by the at least one server computing device, an acoustic search query from the client computing device;

retrieving, from the database and based on the acoustic search query, a first content item and a second content item, the first content item including a first link to a first landing page, the second content item including a second link to a second landing page;

determining that a first image associated with the first landing page is not present in the database;

indexing, responsive to the determination that the first image is not present in the database, the first landing page to generate the first image;

generating a matrix, by the at least one server computing device and during the indexing of the first landing page, the matrix represented by a data structure stored in a database, the matrix including a plurality of portions, each portion is proximate to at least two other portions of the plurality of portions; wherein generating the matrix comprises:

including, in a first portion of the matrix, the first image, and the first link, and text from the first content item;

including, in a second portion of the matrix, a second image and associated with the second landing page of the second content item, and the second link, and text from the second content item; and overlaying, in the first portion of the matrix, the first link on top of the first image, an entire area of the first link within an entire area of the first image;

overlaying, in the second portion of the matrix, the second link on top of the second image, an entire area of the second link within an entire area of the second image; and transmitting, to the client computing device, data for display of the matrix in a webpage.

20. The non-transitory computer-readable storage device of claim 19, comprising:
producing auditory output data for transmission with the data.

* * * * *